(12) United States Patent
Prasadh et al.

(10) Patent No.: US 7,222,262 B2
(45) Date of Patent: May 22, 2007

(54) METHODS AND DEVICES FOR INJECTING COMMANDS IN SYSTEMS HAVING MULTIPLE MULTI-PROCESSOR CLUSTERS

(75) Inventors: Guru Prasadh, Austin, TX (US);
David Brian Glasco, Austin, TX (US);
Rajesh Kota, Austin, TX (US); Scott Diesing, Round Rock, TX (US)

(73) Assignee: Newisys, Inc., Austin, TX (US)

( * ) Notice: Subject to any disclaimer, the term of this patent is extended or adjusted under 35 U.S.C. 154(b) by 678 days.

(21) Appl. No.: 10/635,700

(22) Filed: Aug. 5, 2003

(65) Prior Publication Data

US 2005/0034039 A1 Feb. 10, 2005

(51) Int. Cl.
*G06F 11/00* (2006.01)
(52) U.S. Cl. .......................................... 714/31; 714/41
(58) Field of Classification Search .................. 712/29; 714/41, 31
See application file for complete search history.

(56) References Cited

U.S. PATENT DOCUMENTS

| | | | | |
|---|---|---|---|---|
| 5,125,081 A | * | 6/1992 | Chiba | 710/104 |
| 5,822,531 A | * | 10/1998 | Gorczyca et al. | 709/221 |
| 6,003,075 A | * | 12/1999 | Arendt et al. | 709/221 |
| 6,167,492 A | | 12/2000 | Keller et al. | 711/154 |
| 6,385,705 B1 | | 5/2002 | Keller et al. | 711/154 |
| 6,490,661 B1 | | 12/2002 | Keller et al. | 711/150 |
| 6,553,439 B1 | * | 4/2003 | Greger et al. | 710/62 |
| 7,010,617 B2 | * | 3/2006 | Kampe et al. | 709/248 |
| 7,043,569 B1 | * | 5/2006 | Chou et al. | 710/8 |
| 2002/0065646 A1 | | 5/2002 | Waldie et al. | 703/26 |
| 2002/0157035 A1 | * | 10/2002 | Wong et al. | 714/4 |
| 2002/0174168 A1 | * | 11/2002 | Beukema et al. | 709/201 |
| 2003/0037224 A1 | | 2/2003 | Oehler et al. | 712/29 |

OTHER PUBLICATIONS

Bossen et al. "Fault-tolerant design of the IBM pSeries 690 system using POWER4 processor technology." IBM J. Res. and Dev. vol. 46, No. 1, Jan. 2002.*
HyperTransport™ I/O Link Specification Revision 1.03, HyperTransport™ Consortium, Oct. 10, 2001, Copyright © 2001 HyperTransport Technology Consortium.

* cited by examiner

*Primary Examiner*—Robert W. Beausoliel, Jr.
*Assistant Examiner*—Philip Guyton
(74) *Attorney, Agent, or Firm*—Beyer Weaver LLP

(57) ABSTRACT

Techniques and devices are provided for injecting transactions within computer systems having a plurality of multi-processor clusters. Each cluster includes a plurality of nodes, including processors, a service processor and an interconnection controller interconnected by point-to-point intra-cluster links. The processors and the interconnection controller in each cluster make transactions via an intra-cluster transaction protocol. Inter-cluster links are formed between interconnection controllers of different clusters. Each of the processors and the interconnection controller in a cluster has a test interface for communicating with the service processor. The service processor is configured to make an injected transaction according to the intra-cluster transaction protocol via one of the test interfaces. In preferred embodiments, the service processor is configured to make an injected transaction according to the intra-cluster transaction protocol via a test interface of an interconnection controller in the same cluster.

26 Claims, 13 Drawing Sheets

L# - Link number
N# - Node number

| | | Local Table | | Global Table | | | |
|---|---|---|---|---|---|---|---|
| | | Dest Node | | Dest Cluster | | | |
| Source | | $N_0$ | $N_1$ | $C_0$ | $C_1$ | $C_2$ | $C_3$ |
| Cluster 0 | Node 0 | X | $L_0$ | NA | NA | NA | NA |
| | Node 1 | $L_0$ | X | X | $L_1$ | $L_2$ | $L_1$ |
| Cluster 1 | Node 0 | X | $L_0$ | NA | NA | NA | NA |
| | Node 1 | $L_0$ | X | $L_1$ | X | $L_2$ | $L_2$ |
| Cluster 2 | Node 0 | X | $L_0$ | NA | NA | NA | NA |
| | Node 1 | $L_0$ | X | $L_2$ | $L_2$ | X | $L_1$ |
| Cluster 3 | Node 0 | X | $L_0$ | NA | NA | NA | NA |
| | Node 1 | $L_0$ | X | $L_2$ | $L_2$ | $L_1$ | X |

| Name | Description |
|---|---|
| HT Data | Data Associated with the Mailbox HT Command |
| Data Valid | Valid bit for each double word (DW) of HT data |
| RCV LINK ID | Indicates the ID of link on which the packet was received. |
| XMT LINK SEL | Transmit Link Selector. |
| DATA PTRV | Data Pointer Valid. Indicates that the mailbox HT command has data associated with it. |
| DATA PTR | Data Pointer. |
| REM Link Ext | Remote Link Extension Bits. Contains information pertaining to remote links such as QUAD ID etc. |
| HT CMD | 64-bit HT Command |
| SPJTAG_CMD | Command issued to the SPJTAG Unit. A non-zero value in this field causes the HT CMD field to be ignored. |
| NRE | No Response Expected. Indicates that no response is to be expected for the HT command shifted in. When set, it causes the Fbit to be set as soon as the command is accepted. |
| FRC | Force Command Bit. When set, the supplied command is forced into the system ignoring the Finished status bit. |
| PRIO | Priority Command Bit. Set by software to indicate that the HT Command needs to be sent to the CAR directly. This bit should be set only for configuration RD/WR HT Commands to the local Horus. |
| P_bit | Command Pending Bit. Set by software to indicate that there is a new command shifted into the mailbox register. |
| F_bit | Finished Bit. Set by Horus on completing the HT command. Indicates that the response to the command is ready to be captured from the Horus mailbox register. |

Fig. 8

METHODS AND DEVICES FOR INJECTING COMMANDS IN SYSTEMS HAVING MULTIPLE MULTI-PROCESSOR CLUSTERS

CROSS-REFERENCE TO RELATED APPLICATIONS

This application is related to U.S. patent application Ser. No. 09/932,456, filed Aug. 16, 2001 and U.S. patent application Ser. Nos. 10/157,384 and 10/156,893, both of which were filed on May 28, 2002. All of the foregoing applications are hereby incorporated by reference.

BACKGROUND OF THE INVENTION

The present invention relates generally to multi-processor computer systems. More specifically, the present invention provides techniques for building computer systems having a plurality of multi-processor clusters.

A relatively new approach to the design of multi-processor systems replaces broadcast communication among processors with a point-to-point data transfer mechanism in which the processors communicate similarly to network nodes in a tightly-coupled computing system. That is, the processors are interconnected via a plurality of communication links and requests are transferred among the processors over the links according to routing tables associated with each processor. The intent is to increase the amount of information transmitted within a multi-processor platform per unit time.

Previous implementations of such systems have had shortcomings. Some of these shortcomings relate to obtaining debugging information while the system is running. For example, prior implementations do not provide the ability to determine a configuration state of nodes in a cluster while the system is running. Instead, the system would need to be brought down in order to determine such configurations. Similarly, prior implementations have had a limited ability to respond to information determined during a debugging operation. For example, it would be desirable to fix problems such as deadlocks due to dropped packets, etc., without bringing the system down. It is therefore desirable to provide methods and devices by which multiple-cluster computing systems have improved troubleshooting and debugging functionality.

SUMMARY OF THE INVENTION

According to the present invention, techniques are provided for injecting transactions within computer systems having a plurality of multi-processor clusters. Each cluster includes a plurality of nodes, including processors, a service processor and an interconnection controller interconnected by point-to-point intra-cluster links. The processors and the interconnection controller in each cluster make transactions via an intra-cluster transaction protocol. Inter-cluster links are formed between interconnection controllers of different clusters.

Each of the processors and the interconnection controller in a cluster has a test interface for communicating with the service processor. The service processor is configured to make an injected transaction according to the intra-cluster transaction protocol via one of the test interfaces. In preferred embodiments, the service processor is configured to make an injected transaction according to the intra-cluster transaction protocol via a test interface of an interconnection controller in the same cluster.

Some embodiments of the invention provide a computer system. The computer system includes a plurality of processor clusters, each cluster including a plurality of nodes. The nodes include processors and an interconnection controller interconnected by point-to-point intra-cluster links. Each of the processors and the interconnection controller communicate within a cluster via an intra-cluster transaction protocol. Inter-cluster links are formed between interconnection controllers of different clusters. The interconnection controllers may communicate between clusters via an inter-cluster transaction protocol. Each of the processors and the interconnection controller in a cluster has a test interface for communicating with a service processor.

At least one of the nodes in a cluster is a command-injecting node configured to receive a command via a test interface and to inject the command into a queue of commands according to the intra-cluster transaction protocol. The test interface may be compliant with the Joint Test Action Group standard. The test interface may also include (or at least may be in communication with) a mailbox register for receiving the command. The mailbox register may be connected with a test data in interface and a test data out interface. The command may be received from the test interface in a first clock domain and at least part of the command-injecting node may operate in a second clock domain.

The injected command may be selected from the group consisting of (a) a command for reading a configuration of a node within a local cluster that includes the service processor that made the injected transaction; (b) a command for writing a configuration of a node within a local cluster that includes the service processor that made the injected transaction; (c) a command for reading a configuration of a node within a remote cluster that does not include the service processor that made the injected transaction; and (d) a command for writing a configuration of a node within a remote cluster that does not include the service processor that made the injected transaction.

The injected command may be, for example, a new transaction or a part of a transaction that was in progress before the command was injected. The new transaction may be within a local cluster that includes the command-injecting node or within a remote cluster that includes the command-injecting node.

The command-injecting node may be any device capable of driving the JTAG port, e.g., an interconnection controller. The command-injecting node may be further configured for receiving injected transactions in the first clock domain and synchronizing the injected transactions to the second clock domain.

Alternative embodiments of the invention provide an interconnection controller for use in a computer system comprising a plurality of processor clusters, wherein each cluster includes a plurality of nodes (including processors) and an instance of the interconnection controller interconnected by point-to-point intra-cluster links. Each of the processors and the interconnection controller within a cluster communicate via an intra-cluster transaction protocol. The interconnection controller is configured to receive commands via a test interface and to inject the commands into a queue of pending commands according to the intra-cluster transaction protocol.

A service processor in a cluster that includes the interconnection controller may operate in a first clock domain and the interconnection controller may operate in a second clock domain. The interconnection controller may be further configured for receiving injected transactions from the service processor in the first clock domain and synchronizing the injected transactions to the second clock domain.

The interconnection controller may include a mailbox register for receiving the injected transaction from the service processor. At least one computer-readable medium having data structures stored therein may be representative of the interconnection controller. The data structures may include a simulatable representation of the interconnection controller. The simulatable representation may include a netlist. The data structures may include a code description of the interconnection controller. The code description may correspond to a hardware description language.

The interconnection controller may be embodied in an integrated circuit. The integrated circuit may be an application-specific integrated circuit. A set of semiconductor processing masks may be representative of at least a portion of the interconnection controller.

A protocol engine may control the queue of pending commands. The interconnection controller may be further configured to process access commands for accessing configuration registers of the interconnection controller without forwarding the access commands to the protocol engine. The interconnection controller may include a configuration access unit for processing access commands.

A further understanding of the nature and advantages of the present invention may be realized by reference to the remaining portions of the specification and the drawings.

BRIEF DESCRIPTION OF THE DRAWINGS

FIG. 8 depicts the format of a mailbox register according to some implementations of the invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
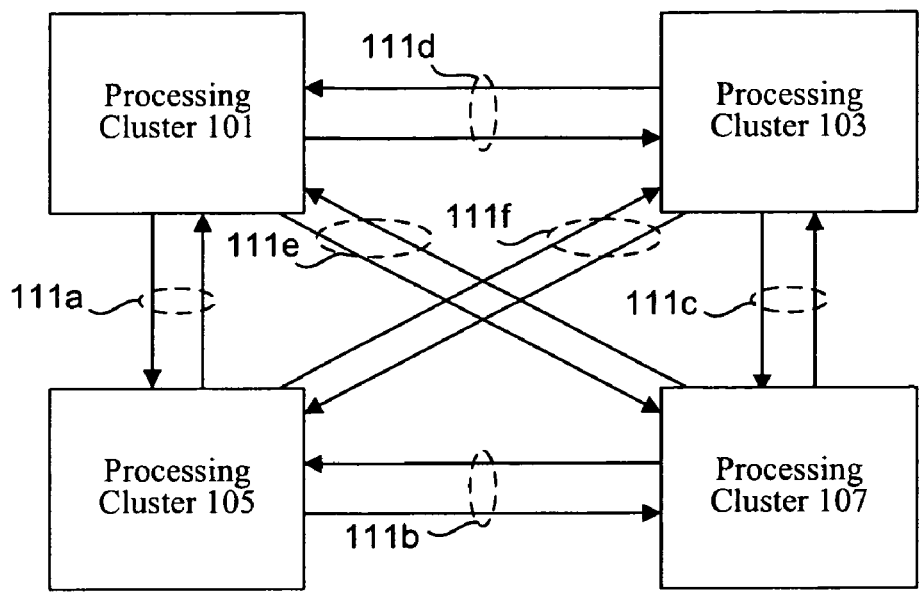
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 111a–f. The multiple processors in the multiple cluster architecture shown in FIG. 1A share a global memory space. In this example, the point-to-point links 11a–f are internal system connections that are used in place of a traditional front-side bus to connect the multiple processors in the multiple clusters 101, 103, 105, and 107. The point-to-point links may support any point-to-point coherence protocol.

Figure 1B:
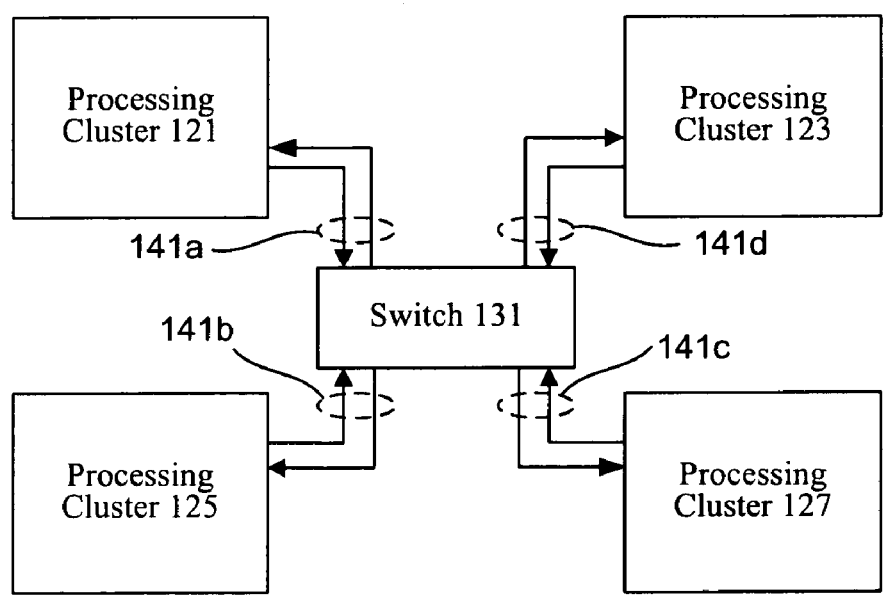

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
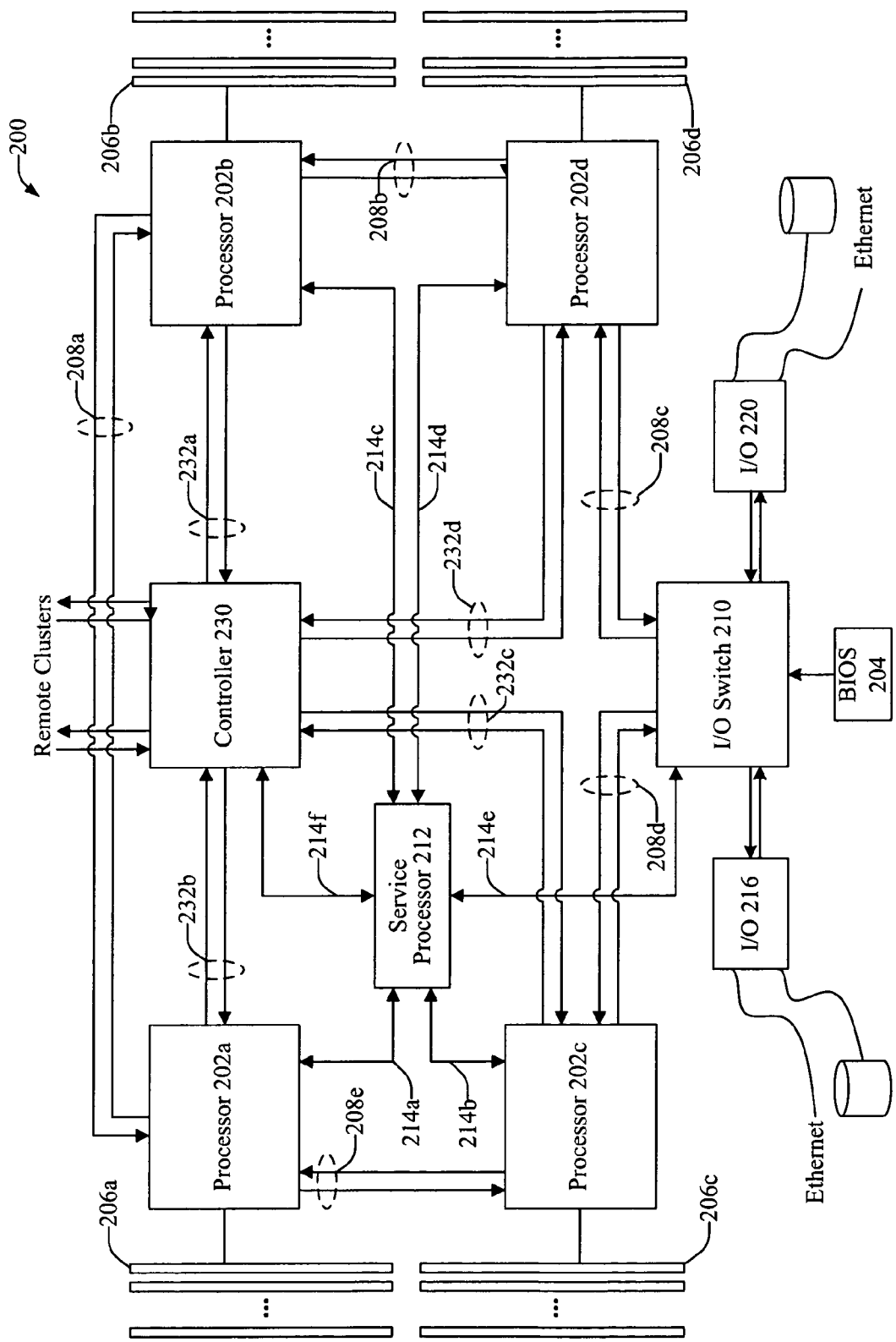
FIG. 2 is a diagrammatic representation of an exemplary cluster having a plurality of processors for use with specific embodiments of the present invention.

FIG. 2 is a diagrammatic representation of a multiple processor cluster such as, for example, cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220, and to BIOS 204 for booting purposes.

Service processor 212 is primarily responsible for partitioning the resources of cluster 200. According to some embodiments, service processor 212 allocates usage of processor 202a–202d and I/O switch 210 although service processor 212 could be programmed to manage directly other resources such as, for example, memory banks or various I/O devices. Service processor 212 may be configured, for example, via a management/server console (not shown) to which service processor 212 is connected.

According to specific embodiments, service processor 212 has the intelligence to partition system resources according to previously specified partitioning schema. The partitioning can be achieved through direct manipulation of routing tables associated with the system processors by service processor 212. Such partitioning is made possible by the point-to-point communication infrastructure. The routing tables can also be changed by execution of the BIOS code in one or more processors. The routing tables are used to control and isolate various system resources, the connections between which are defined therein.

According to a specific embodiment, service processor 212 is an autonomous processor with its own set of operating system applications (which is separate from the operating system(s) associated with the rest of the system) and its own I/O. Service processor 212 can run when the rest of the processors, memory, and I/O are not functioning. Service processor 212 can operate as an external supervising intelligence that ensures all of the system resources are operating as desired.

It should be noted, however, that the previously-specified partitioning schema need not be implemented by a separate service processor. That is, for example, one of the system processors could be employed for this purpose. According to such an embodiment, for example, the system BIOS could be altered to effect the schema using the system's primary processor.

In addition, a partition may represent a variety of system resource combinations. That is, for example, in a "capacity on demand" scenario a partition could be represented by a single processor, removal of the processor from its partition rendering the remaining components unable to run an OS (and therefore the user would not be charged for this partition). A partition could also be represented by a processor and some associated memory or I/O. In general, any functional subset of the resources available in a computer system can be thought of as a partition.

The processors 202a–d are also coupled to an interconnection controller 230 through point-to-point links 232a–d. According to various embodiments and as will be described below in greater detail, interconnection controller 230 performs a variety of functions which enable the number of interconnected processors in the system to exceed the node ID space and mapping table limitations associated with each of a plurality of processor clusters. According to some embodiments, interconnection controller 230 performs a variety of other functions including the maintaining of cache coherency across clusters. Interconnection controller 230 can be coupled to similar controllers associated with other multi-processor clusters. It should be noted that there can be more than one such interconnection controller in one cluster.

Interconnection controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3A:
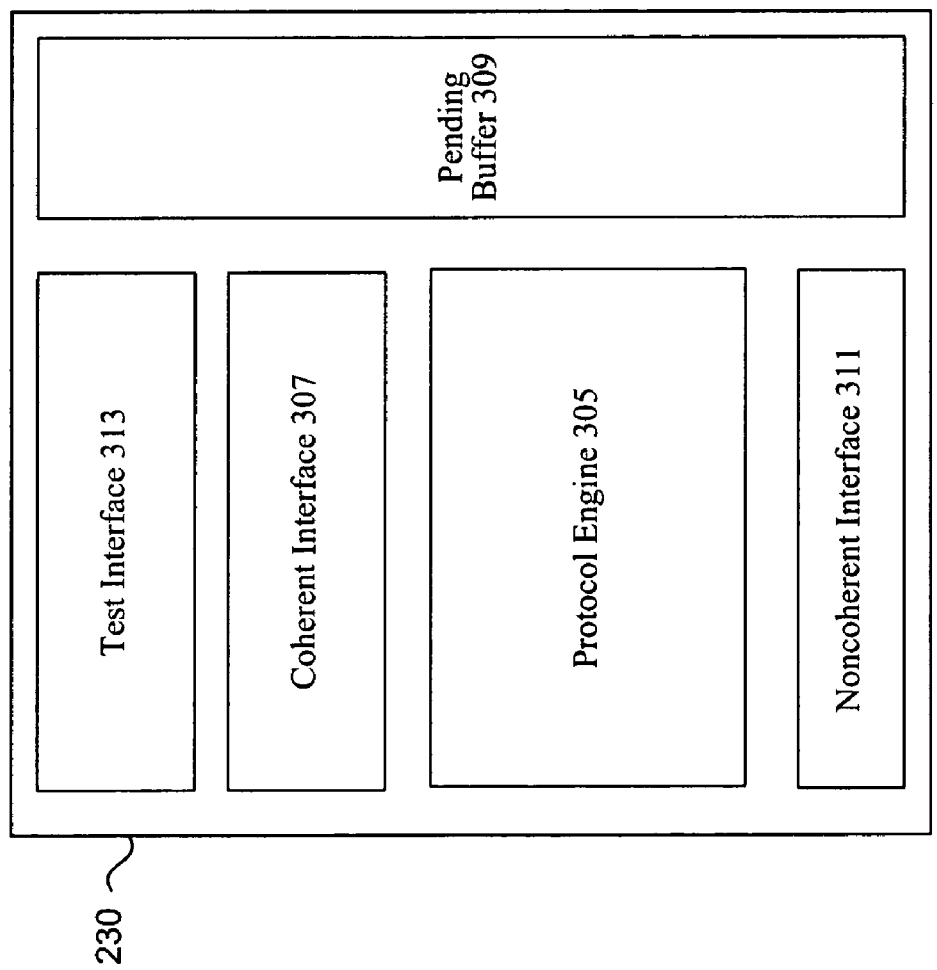
FIG. 3A is a diagrammatic representation of an exemplary interconnection controller for facilitating various embodiments of the present invention.

FIG. 3A is a diagrammatic representation of one example of an interconnection controller 230 for facilitating various aspects of the present invention. According to various embodiments, the interconnection controller includes one or more protocol engines 305 configured to handle packets such as probes and requests received from various clusters of a multi-processor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific nodes, e.g., from specific processors. Transaction information maintained in the pending buffer 309 can include transaction destination nodes, the addresses of requests for subsequent collision detection and protocol optimizations, response information, tags, and state information. As will become clear, this functionality is leveraged to enable particular aspects of the present invention.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices (e.g., as represented in FIG. 2 by links 208c and 208d).

According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 3B:
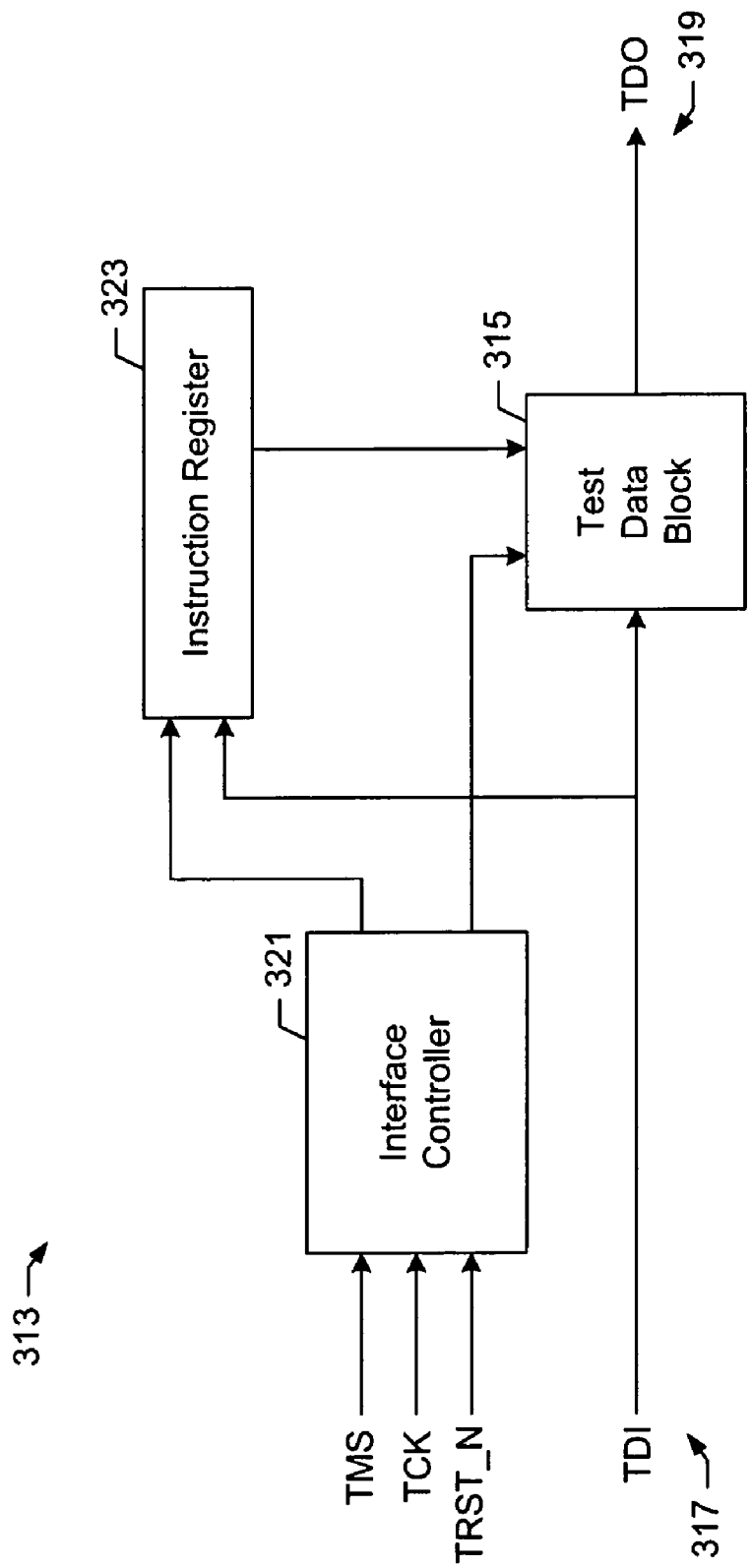
FIG. 3B is a diagrammatic representation of an exemplary test interface of an interconnection controller for facilitating various embodiments of the present invention.

Interconnection controller 230 also includes test interface 313 for communicating with service processor 212. In the specific embodiment illustrated in FIG. 3B, test interface 313 is compliant with the Joint Test Action Group (JTAG) standard, i.e., IEEE Standard Test Access Port and Boundary Scan Architecture, IEEE 1149.1-2001, the entire disclosure of which is incorporated herein by reference for all purposes. The JTAG standard describes, inter alia, the requirements for a test access port (TAP) and boundary scan architecture. However, other test interfaces may be used to implement the present invention.

As is well known, test interface 313 may be a serial interface that connects a series of data registers in test data block 315 between a serial input (here, test data in (TDI) 317) and serial output (here, test data out (TDO) 319) pins. The selection of which register is to be connected between TDI 317 and TDO 319 is controlled by a TAP controller 321 and an instruction register 323. That is, TAP controller 321 selects instruction register 323 and a new instruction is shifted into instruction register 323 via the TDI input 317. This instruction selects for a particular one of the data registers in test data block 315 to be placed into the serial data stream for any of a variety of operations including, for example, the loading of test data into the data register from the TDI input 317, the loading of test results into the data register from the circuit or system being tested, and the shifting of the test results out of the data register onto the TDO output 319.

As stated above, test data block 315 includes a plurality of data registers. Some of these registers may correspond to conventional JTAG data registers. For example, the data registers could correspond to, for example, a bypass register, a boundary scan register or a device identification register. According to various specific embodiments of the invention, test data block 315 also includes at least one register that allows transactions to be injected into a fabric of transactions.

As used herein, a protocol for transactions sent on an intra-cluster link will sometimes be referred to as an "intra-cluster protocol" and a protocol for transactions sent on an inter-cluster link will sometimes be referred to as an "inter-cluster protocol." Specific embodiments of multiple-cluster architecture have used the same protocol for transactions sent on both intra-cluster and inter-cluster links. One such protocol is HyperTransport™ (HT) protocol, which was specifically designed for communication of commands and data among subsystems of a computer system, such as multiple levels of processor caches, local and remote memory elements and various input/output (I/O) devices. The white paper entitled "Meeting the I/O Bandwidth Challenge: How HyperTransport Technology Accelerates Performance in Key Applications" (HyperTransport™ Consortium, December 2002) is hereby incorporated by reference.

According to some implementations of the invention, an interconnection controller mailbox register that provides a mechanism by which commands, data and/or transactions may be injected according to, for example, an intra-cluster protocol used for transactions between an interconnection controller and other nodes in a cluster. If such transactions involve communication with other clusters, the transactions may be converted to an inter-cluster protocol for communication between interconnection controllers in different clusters. One example of such an inter-cluster protocol is described in U.S. patent application Ser. No. 10/635,884, which is hereby incorporated by reference for all purposes. The inter-cluster protocol may be the same as, substantially the same as, or substantially different from the intra-cluster protocol.

According to specific implementations of the invention, the intra-cluster protocol is the HyperTransport™ (HT) protocol and the mailbox register allows commands and/or data to be injected into a queue of HT transactions by service processor 212. Although the HT protocol is often used as an example of an intra-cluster and/or an inter-cluster protocol in this disclosure, the present invention can be used with any of a wide variety of suitable protocol(s). In alternative embodiments, a mailbox register in another node, e.g., in one of processors 202, allows such commands and/or data to be injected.

TAP controller 321 typically implements a finite state machine (FSM), the state of which is controlled by a plurality of inputs. According to a more specific embodiment, the operation of the TAP controller FSM is represented by the state diagram in FIG. 3C, which is a state diagram according to the JTAG standard. The test access port is controlled by the test clock (TCK) and test mode select (TMS) inputs indicated in FIG. 3B, which determine whether an instruction register (IR) scan or a data register (DR) scan is performed. According to some implementations of the invention, a DR corresponds to a mailbox register used to inject transactions and an IR is used to apply instructions to TAP controller 321.

Figure 3C:
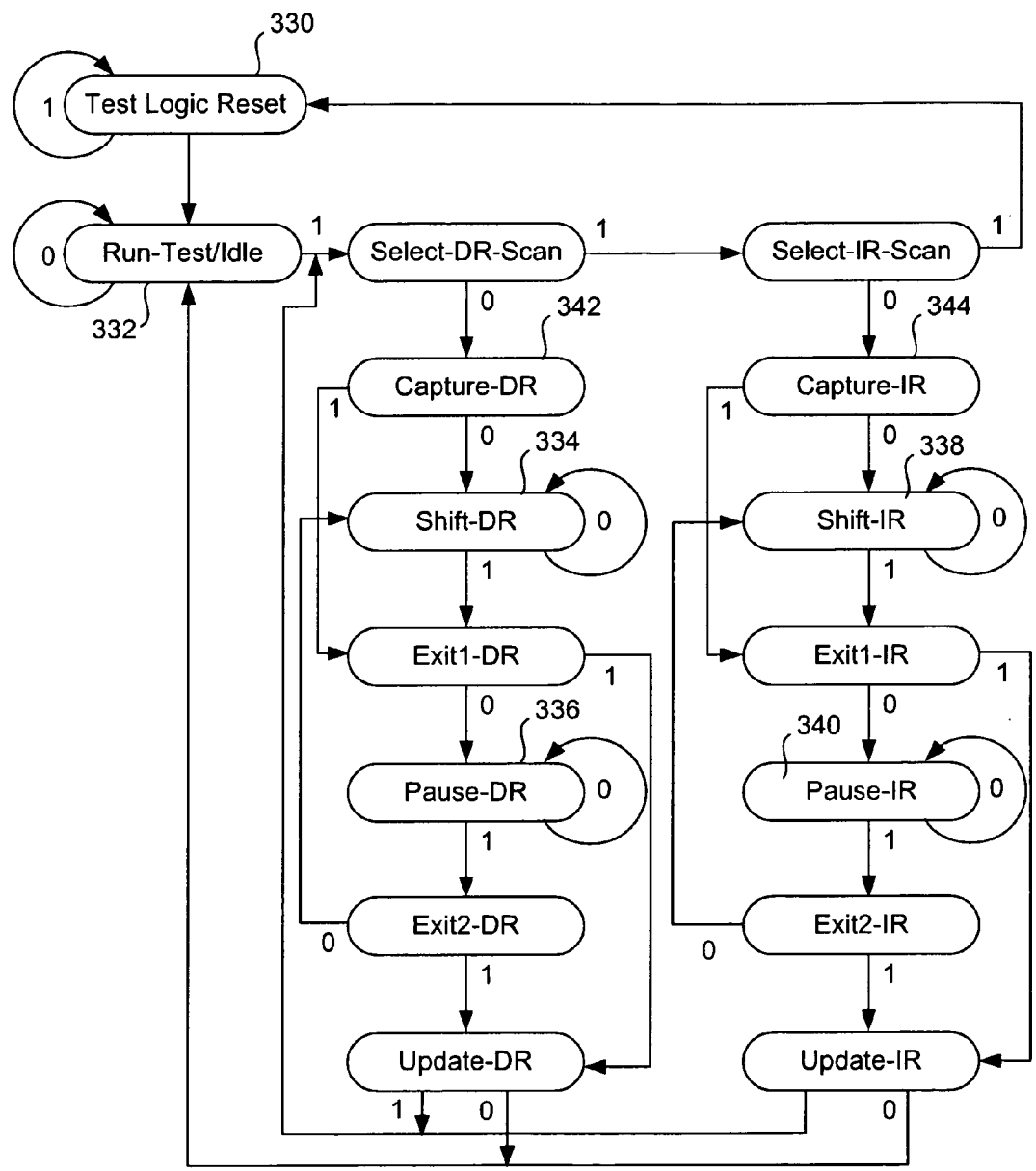
FIG. 3C is a state diagram of a test access port according to the Joint Test Action Group standard.

According to the JTAG standard, TAP controller 321 is driven by both clock edges of the TCK input and responds to TMS input as shown in FIG. 3C. TMS and TDI are sampled on the rising edge of the TCK signal and TDO changes at the falling edge of the TCK signal. The values indicated next to each state transition in FIG. 3C represent the signal present at the TMS at the rising edge of the TCK signal.

The principal part of the TAP controller FSM consists of six steady states: Test-Logic-Reset state 330, Run-Test/Idle state 332, Shift-DR state 334, Pause-DR state 336, Shift-IR state 338 and Pause-IR state 340. According to the JTAG protocol, only one steady state (Test-Logic-Reset 330) exists for the condition in which TMS is set high. Therefore, the test logic can be reset within 5 TCK signals or less by setting the TMS input high.

During normal operation (or at power up), the TAP controller is forced into the Test-Logic-Reset state 330 by driving the TMS input high and by using 5 or more TCK signals. In Test-Logic-Reset state 330, TAP controller 321 issues a reset signal, causing all test logic to be in a condition that does not hinder normal operation. When test access is needed, a protocol is indicated by the TCK and TMS inputs that causes TAP controller 321 to exit Test-Logic-Reset state 330 and proceed through the appropriate states. From Run-Test/Idle state 332, an instruction register scan (or a data register scan) can be issued to move TAP controller 321 through the appropriate states. As shown in FIG. 3C, each state of an instruction register scan has a corresponding state for a data register scan.

The first action of either scan operation is a capture operation. For a data register scan, TAP controller 321 enters Capture DR state 342 and for an instruction register scan, TAP controller 321 enters Capture IR state 344. In Capture DR state 342, data are loaded into the selected serial data path. In Capture IR state 344, status information is captured by the instruction register.

From a Capture state, TAP controller 321 enters either a Shift state or an Exit1 state. More commonly, TAP controller 321 enters a Shift state, enabling test data or status information to be shifted out for inspection and new data/information to be shifted in. After a Shift state, TAP controller 321 transitions either to Run-Test/Idle state 332 by way of the Exit1 and Update states, or to a Pause state via Exit1. The Pause state may be entered in order to temporarily stop shifting data through the selected instruction or data register while a necessary operation is performed (e.g., refilling a test memory buffer). Shifting data through the register may resume after a Pause state by returning to a Shift state by way of an Exit2 state. Alternatively, shifting data through the register may be stopped by transitioning to Run-Test/Idle state 332 by way of the Exit2 and Update states.

Figure 4A:
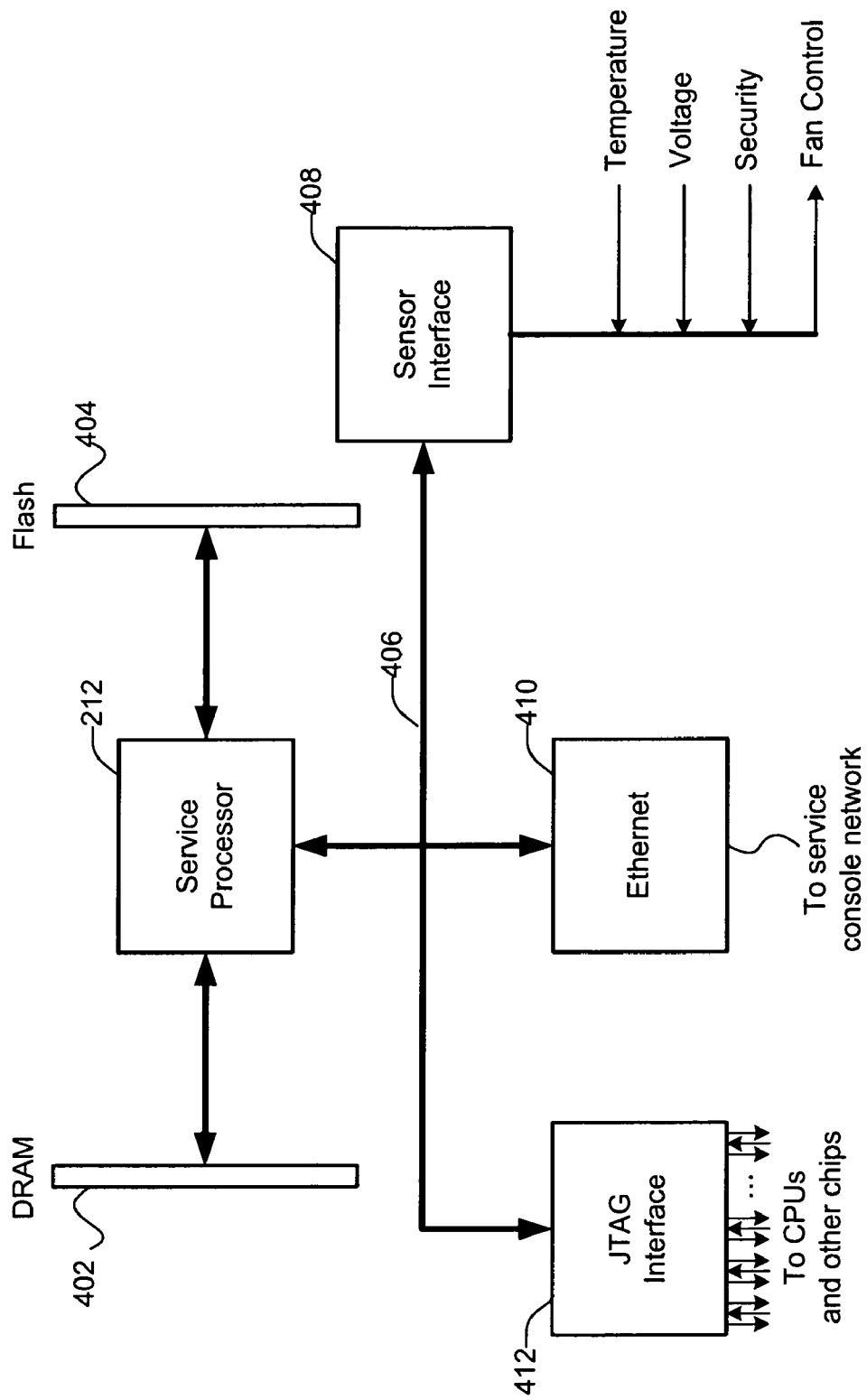
FIG. 4A is a diagrammatic representation of a service processor for use with various embodiments of the present invention.

FIG. 4A is a high-level block diagram of the interconnections for service processor 212 according to one implementation. In this example, service processor 212 has various functions, including partitioning of system resources, controlling test interface 412 and other functions. It is important to note that a partitioning engine could look very different from service processor 212 as depicted in FIG. 4A. That is, any mechanism that can intelligently reconfigure the routing tables using a point-to-point communication infrastructure could perform such partitioning. For example, other possible mechanisms include using one or more of processors 202 to effect the partitioning.

In this embodiment, service processor 212 has direct connections to a DRAM storage block 402 and flash memory 404. DRAM 402 facilitates execution by the service processor of a program stored in flash 404. Service processor 212 is also connected via PCI bus 406 to a sensor interface 408, an Ethernet card 410, and a JTAG interface 412. Sensor interface 408 may include, for example, inputs from monitoring circuits (not shown) which provide indications of temperature, supply voltage, or security locks. Sensor interface 408 may also have various outputs such as, for example, a control signal for activating the system's fan. Ethernet card 410 provides an interface between service processor 212 and, for example, a service console by which the network administrator can monitor and configure the server.

In the specific embodiment described herein, test interface 412 (like test interface 313) is compliant with the JTAG standard. Test interface 412 includes a TAP with several pins, including a TDI pin, a TDO pin, a test clock (TCK) pin, a test mode select (TMS) pin, and, optionally, a test reset (TRST) pin for driving the TAP controller to the test-logic-reset state.

As will be explained further below, test interface 412 facilitates communication between service processor 212 and processors 202a–202d, thereby enabling both static and dynamic partitioning of the computer system's resources. According to a specific embodiment, this communication is facilitated using a simple outbound multiplexer.

Figure 4B:
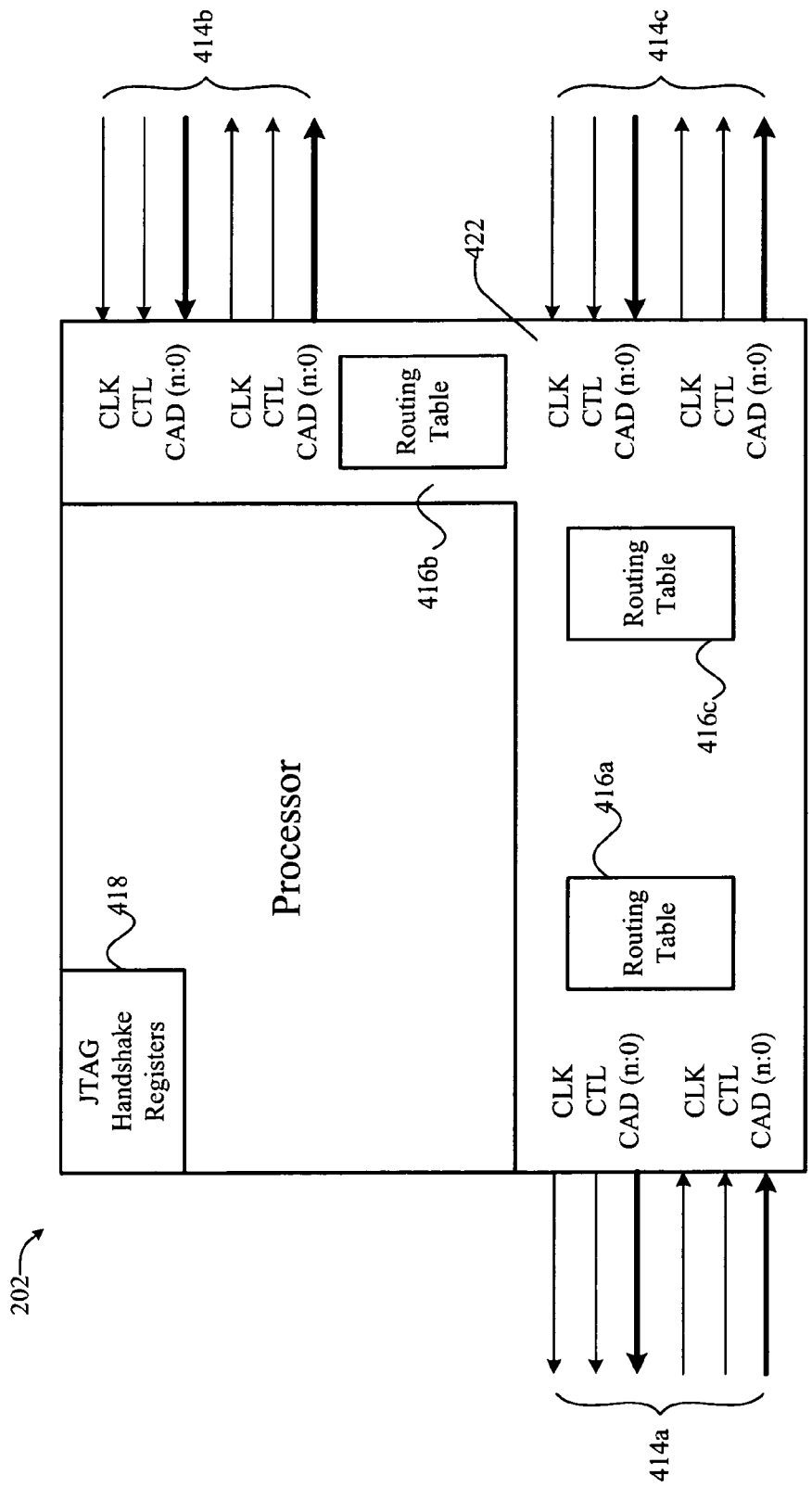
FIG. 4B is a diagrammatic representation of a local processor for use with various embodiments of the present invention.

According to various embodiments of the invention, processors 202a–202d are substantially identical. FIG. 4B is a simplified block diagram of such a processor 202, which includes an interface 422 having a plurality of ports 414a–414c and routing tables 416a–416c associated therewith. Each port 414 allows communication with other resources, e.g., processors or I/O devices, in the computer system via associated links, e.g., links 208a–208e of FIG. 2.

The infrastructure shown in FIG. 2 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor that has a unique node ID and a plurality of associated resources that it "owns," e.g., the memory and I/O to which it is connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4B, processor 202 can conduct point-to-point communication with three other processors according to the information in the associated routing tables. According to a specific embodiment, routing tables 416a–416c comprise two-level tables, a first level associating the unique addresses of system resources (e.g., a memory bank) with a corresponding node (e.g., one of the processors), and a second level associating each node with the link (e.g., 208a–208e) to be used to reach the node from the current node.

Processor 202 also has a set of JTAG handshake registers 418 which, among other things, facilitate communication between the service processor (e.g., service processor 212 of FIG. 2) and processor 202. That is, the service processor can write routing table entries to handshake registers 418 for eventual storage in routing tables 416a–416c. It should be understood that the processor architecture depicted in FIG. 4B is merely exemplary for the purpose of describing a specific embodiment of the present invention. For example, a fewer or greater number of ports and/or routing tables may be used to implement other embodiments of the invention.

According to a specific embodiment, cluster 200 of FIG. 2 may be configured using the techniques described herein to operate as a single four-processor system, or as two or more functionally separate partitions. In contrast to a "greedy" algorithm, which operates without a priori knowledge of the eventual system configuration, service processor 212 facilitates the configuration of cluster 200 by generating and/or dynamically altering the routing tables associated with all or some of processors 202a–202d (and I/O switch 210) according to previously-specified partitioning schema. This can be accomplished by service processor 212 writing routing table entries to the JTAG handshake registers of the appropriate processors (and similar tables associated with I/O switch 210) via interface links 214a–214e. As described in U.S. patent application Ser. No. 09/932,456, filed Aug. 16, 2001, which is incorporated by reference in its entirety, this system configuring/partitioning may be done either statically, e.g., at server boot up, or dynamically, e.g., during operation of cluster 200.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism that preserves the single-layer identification scheme within particular clusters while enabling interconnection with and communication between other similarly situated clusters and processing nodes.

According to a specific embodiment, at least one of the nodes in each multi-processor cluster corresponds to an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a–d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
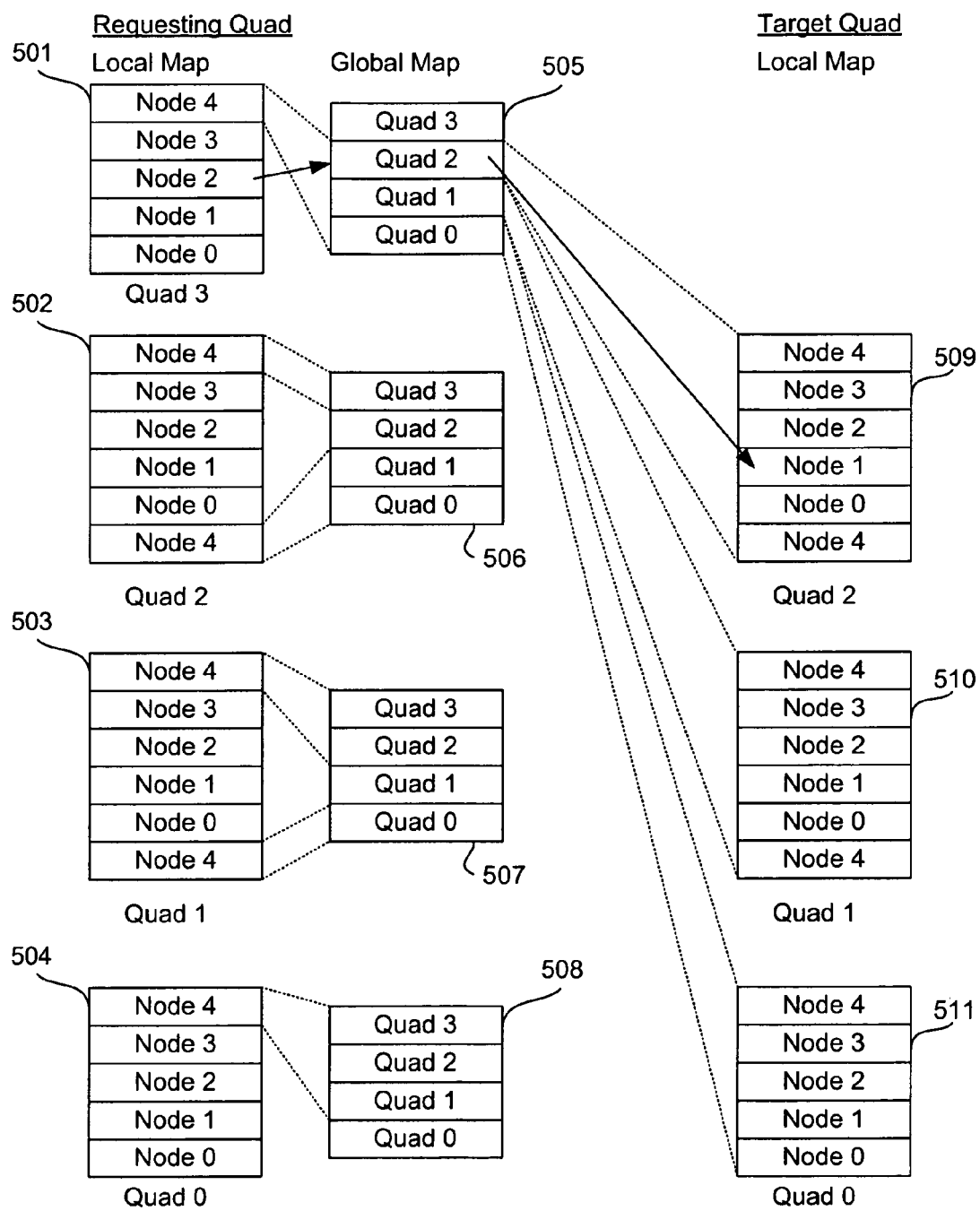
FIG. 5 is a diagrammatic representation of a memory mapping scheme according to a particular embodiment of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501–504), which maps the local memory space (i.e., the contiguous portion of the global memory space associated with the local processors) into the respective nodes and maps all remote memory spaces (i.e., the remainder of the global memory space) into one or two map entries associated with the local interconnection controller(s), e.g., Node 4 of Quad 3. Each node in the local cluster has a copy of the local map. The interconnection controller in each cluster also maintains a global map (505–508) relating these remote memory spaces with each of the other clusters in the system. Each interconnection controller uses its copy of the local map (509–511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information which maps the other clusters in the system to the various point-to-point transmission links interconnecting the clusters (e.g., links 111 of FIG. 1A).

According to a specific embodiment, two types of local routing tables are employed: one for directed packets and one for broadcast packets. Each table (e.g., tables 406 of FIG. 4B) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller, its local tables map a local destination node to one of four links for directed packets and any number of links for broadcast packets. The interconnection controller also maintains a global routing table which maps remote destination clusters to a particular remote link. According to a particular embodiment, the interconnection controller also supports multicast of packets at the global routing level.

Figures 6A, 6B:
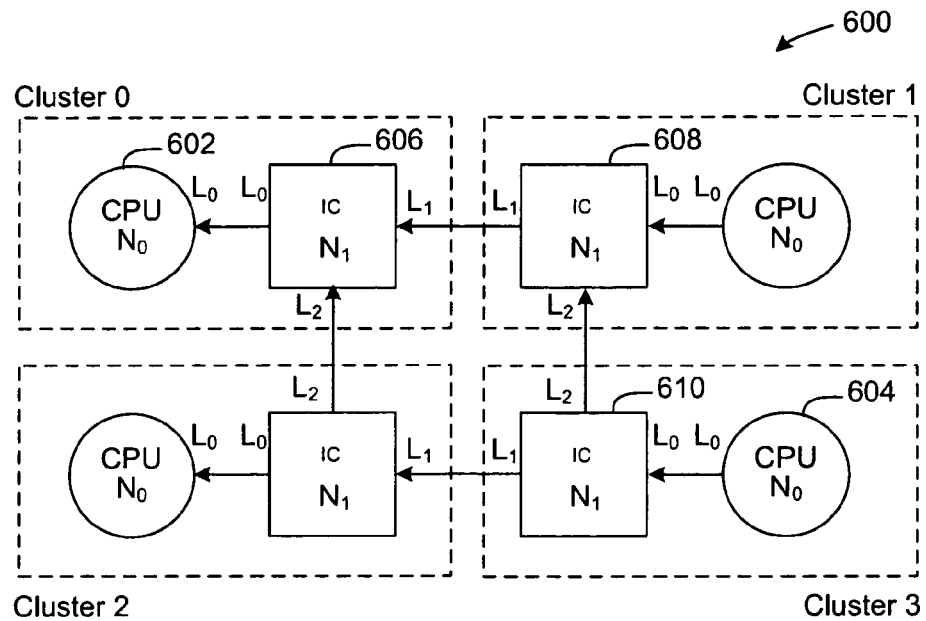
FIG. 6A is a simplified block diagram of a four cluster system for illustrating a specific embodiment of the invention.
FIG. 6B is a combined routing table including routing information for the four cluster system of FIG. 6A.

A specific embodiment of a routing mechanism will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node $N_0$ in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$ in Cluster 0 (i.e., the local interconnection controller 606) as the destination. As discussed above, this is due to the fact that the local memory map owned by node $N_0$ (see the relevant portion of the table of FIG. 6B) identifies node $N_1$ as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node $N_0$ then receives the packet via link $L_0$. According to specific embodiments in which the node ID space is a 3-bit ID space, this multi-level routing mechanism can be extended to eight local nodes with no specific limit on the number of clusters.

Embodiments described herein also address the issue of transaction identification in a system having a plurality of multi-processor clusters. In general, the importance of the unique identification of transactions in a multi-processor environment is understood. Where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, embodiments described herein provide mechanisms that extend the local tag spaces such that each transaction in the multi-cluster system is uniquely identified.

More specifically, these embodiments map transactions from the local transaction tag space to a larger global transaction tag space. As described above, the local tag space is specified using the node ID, the unit ID, and a transaction ID. On top of that, the global tag space is specified using a global cluster ID and a global transaction ID. According to one embodiment, the interconnection controllers in the system use their pending buffers to simplify the allocation and management of the mapping and remapping actions. According to an even more specific embodiment and as will be described, additional protocol management is used to maintain the uniqueness of the global transaction tags.

According to a specific embodiment, all transactions within a cluster are tagged with a unique ID generated by the requesting node. The processors in each cluster that are not the interconnection controller support a 3-bit node ID, a 2-bit unit ID and a 5-bit transaction ID. The combination of these fields creates a 10 bit tag which is unique within the cluster. The unit ID represents sub-units within a node. It should be noted that a particular node may or may not include a processor as one of its sub-units, e.g., the node might contain only memory.

According to one embodiment, to extend to the transaction tag space beyond the local cluster, each cluster's interconnection controller maps each its cluster's local tag space into the global tag space using a Q-bit Cluster ID and a T-bit Transaction ID. In the exemplary system in which each cluster has a 5-bit transaction ID and there are four clusters, T might be 7 and Q might be 2.

The local-to-global and global-to-local mapping techniques set forth in U.S. patent application Ser. No. 10/157, 384 also may be used in connection with the present invention. As noted above, that application is incorporated herein by reference for all purposes.

The previously-described methods and devices provide an exemplary framework for intra-cluster and inter-cluster transactions. The present invention provides methods for injecting commands into a pipeline or queue of intra-cluster or inter-cluster transactions, whether the queue is created according to the exemplary framework described above or according to another framework. As used herein, a "command" is used broadly and may include, for example, an instruction and associated data, when appropriate. A "command" may include all or any part of a transaction, such as a request, a response, etc. According to preferred implementations of the invention, commands may be injected into a pipeline of transactions "on the fly," i.e., while the system is running. Some preferred implementations do not require an interconnection controller to be configured in a special mode in order for such transactions to be injected.

Figure 7:
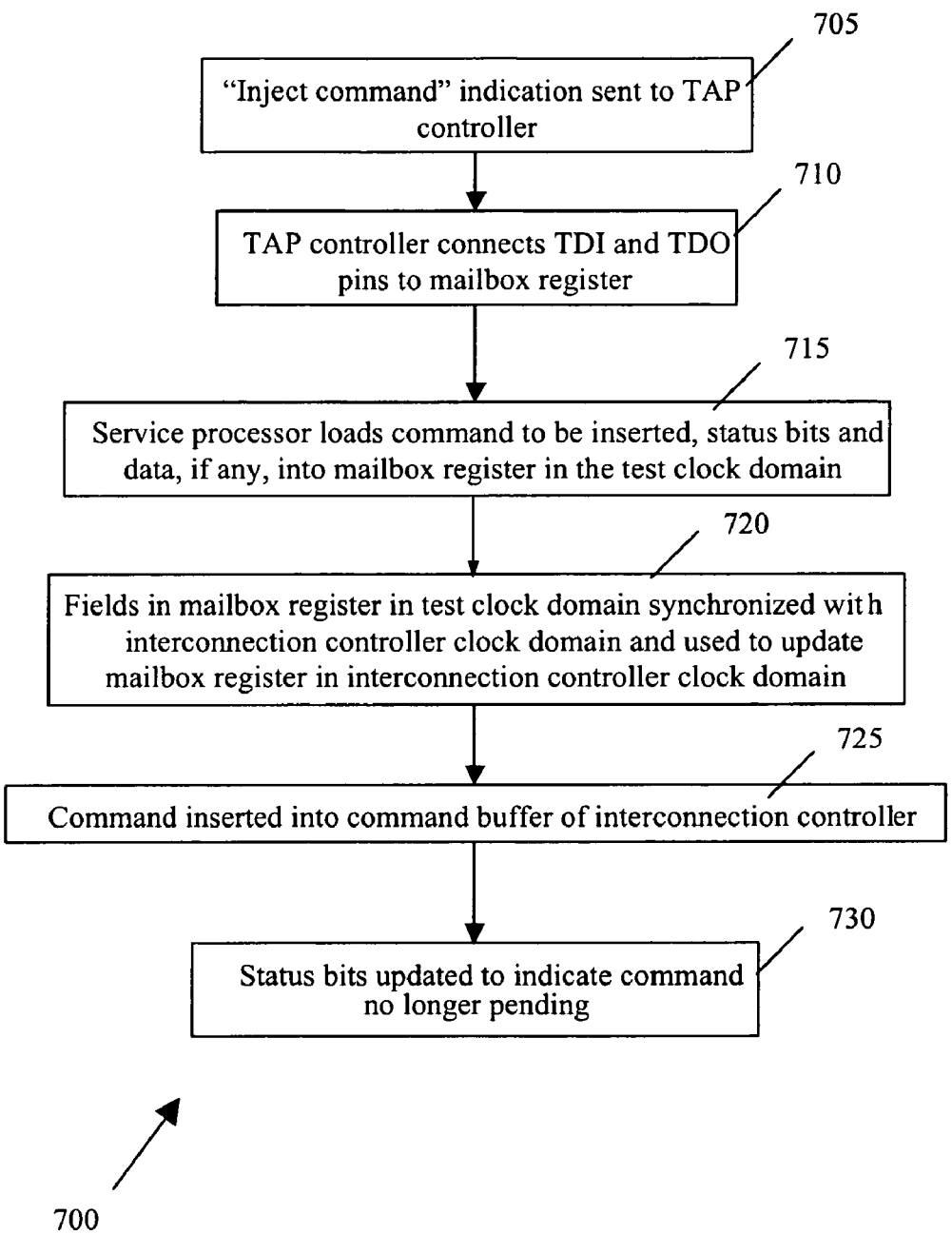
FIG. 7 is a flow chart that provides an overview of a command injection process according to some implementations of the invention.

FIG. 7 is a flow chart that provides an overview of an exemplary method of the present invention. Further details of this process will be described below with reference to FIGS. 9 and 10. In step 705, an "inject command" indication is sent to a test interface. According to the specific embodiment described with reference to FIG. 7, service processor 212 (see FIG. 2) sends the indication to TAP controller 321 of interconnection controller 230 (see FIGS. 3A and 3B). In other embodiments, another device sends the indication and/or other signals to a test interface. The indication may be sent in response to a user's input, for example, during a troubleshooting and/or debugging operation. The user may also indicate the command to be inserted, whether by service processor 212 or otherwise. In some embodiments, a user interacts with a graphical user interface to send the indication and to insert command.

In response to this command, in step 710 TAP controller 321 connects the TDI and TDO pins to a data register within test data block 315 that has been designated a mailbox register. In step 715, service processor 212 loads a command packet, associated data (if any) and status bits into the mailbox register. An exemplary format for this information will be described below with reference to FIG. 8.

The mailbox register that receives this information from the service processor is in a test clock domain that is typically a slower clock domain than that of the interconnection controller. For example, the TAP clock domain may be on the order of 1 to 10 MHz, whereas the clock domain of the interconnection controller may be on the order of 400 MHz or more. Therefore, in step 720, the fields in mailbox register of the test clock domain are synchronized with the interconnection controller clock domain and used to update the corresponding fields of a mailbox register in the interconnection controller clock domain.

In step 725, the command from the mailbox register in the interconnection controller clock domain is inserted into a command buffer of the interconnection controller. In step 730, status bits of the mailbox are updated to indicate that the command is no longer pending.

FIG. 8 illustrates an exemplary format 800 for packets to be shifted into mailbox registers. Preferably, the same format is used for the mailbox registers of the test clock domain and of the interconnection controller clock domain. In this example, the underlying protocol is the HT protocol and the mailbox register is used to facilitate the injection of HT commands.

HT Data field 805 is used to encode data, if any, associated with a command in the mailbox register. Data Valid field 810 includes a valid bit for each double word of data in HT Data field 805. RCV LINK ID field 815 states which link conveyed the packet to the mailbox. XMT LINK SEL field 820 indicates a link for transmission of the packet.

DATA PTRV field 825 is a "data pointer valid" field that indicates whether there are data associated with a command in the mailbox. DATA PTR field 830 is the associated data pointer field. REM Link Ext field 835 includes information (if relevant) pertaining to remote links. For example, such information may identify remote clusters, as described above with reference to FIGS. 5, 6A and 6B.

Next is the HT CMD field 840, which includes an HT command to be injected via the mailbox. Such commands may allow, for example, configuration registers to be read or written, whether the configuration registers are in a local cluster or a remote cluster. The command may initiate a new transaction in a local cluster (e.g., a Memory Read request to a local processor) or in a remote cluster (e.g., a Read Block request to a remote cluster). Alternatively, the injected command may be a part of a transaction that is already in progress (e.g., a probe response to a Read request). Such commands may be particularly useful during a debugging operation for breaking deadlocks due to missing packets, e.g., missing probe responses from a remote cluster. As noted above, the present invention is not limited to injecting HT commands, but may be used with any suitable protocol.

Figure 10:
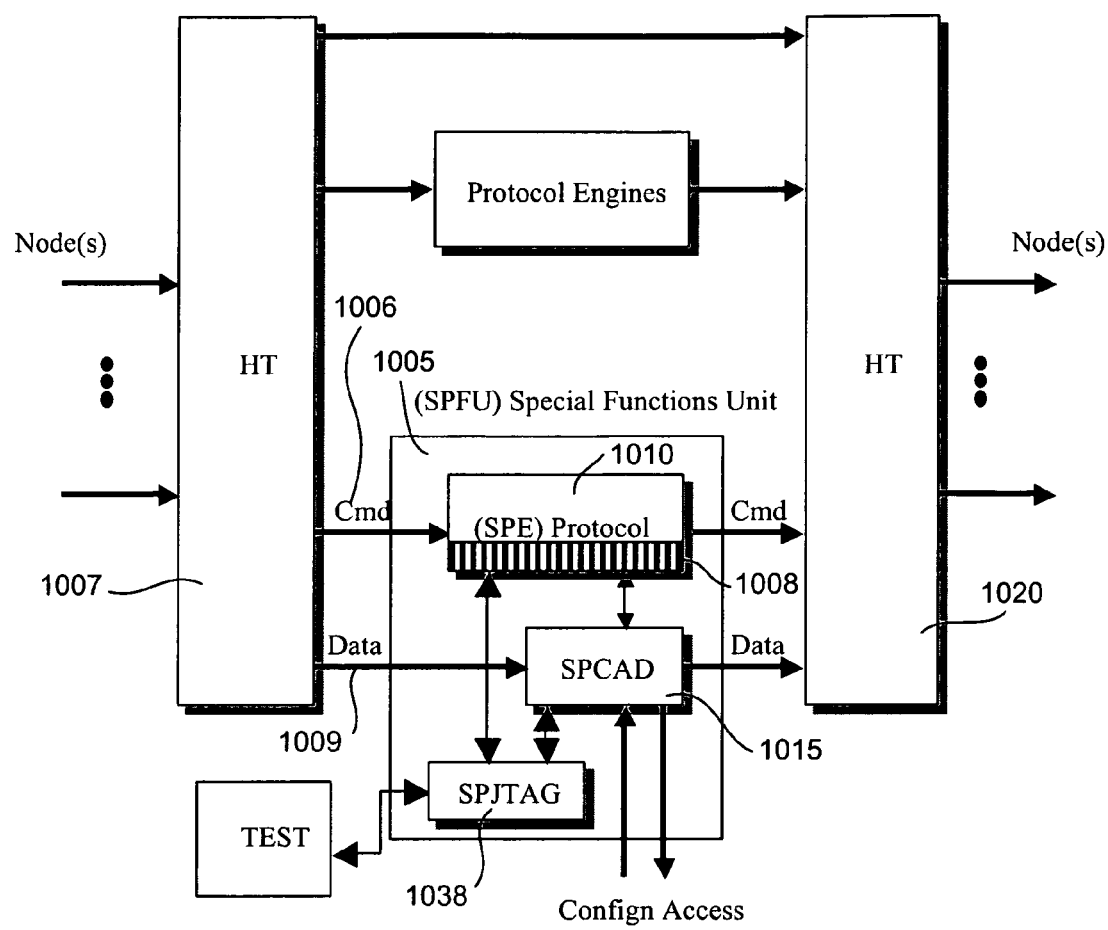
FIG. 10 is a block diagram that illustrates components of an interconnection controller that can implement some features of the present invention.

SPJTAG_CMD field 845 is for commands directed to the SPJTAG module inside the Special Functions Unit illustrated in FIG. 10. According to some implementations, SPJTAG_CMD field 845 is relatively small, e.g., 3 bits. If SPJTAG_CMD field 845 includes a non-zero value, HT CMD field 840 will be ignored.

According to one implementation, there are 2 SPJTAG commands. The first SPJTAG command clears the Finished and Pending bits. This command is used when 2 responses are expected for an injected HT command. After the first response is captured and shifted out, this SPJTAG command is shifted in so that the F and P bits get cleared. This procedure allows the second response from the system to be written into the mailbox. The second response can then be shifted out during the next Capture-DR.

The second SPJTAG command resets the Configuration register Access mechanism inside interconnection controller 230. This command is used in situations where the configuration register access mechanism inside Horus fails to operate correctly and needs to be reset.

Fields 850 through 870 are single-bit fields according to some implementations. When NRE bit 850 is set, this indicates that no response is to be expected for the command shifted in. Accordingly, Finished bit 870 will be set as soon as the command is accepted. When FRC bit 855 is set, the command is forced into the system and Finished bit 870 is ignored. PRIO bit 860 indicates that the command should be sent directly to Special Functions Configuration Access Dispatch ("SPCAD") unit 1015, (see FIG. 10). PRIO bit 860 is used with commands to access configuration registers in the local interconnection controller 230. When PRIO bit 860 is not set, the injected HT command is sent to SPE Protocol Engine 1010 for decoding. If the command is a configuration access command to the local interconnection controller, SPE Protocol Engine 1010 forwards the command to SPCAD unit 1015, which sends a response to SPE Protocol Engine 1010. SPE Protocol Engine 1010 then forwards the response back to SPJTAG unit 1038, where the response is written into the mailbox register.

If the PRIO bit is set, however, the injected configuration access command is sent directly to SPCAD unit 1015, bypassing the SPE Protocol Engine 1010. In addition, the response from SPCAD unit 1015 is sent directly back to SPJTAG unit 1038, bypassing SPE Protocol Engine 1010.

Thus, the PRIO bit mechanism provides a way of bypassing SPE Protocol Engine 1010 for configuration accesses to the local interconnection controller. The PRIO bit mechanism offers 2 benefits. First, it provides a way to work around logic bugs in the logically complex SPE Protocol Engine 1010 (that may make SPE Protocol Engine 1010 inoperable) by bypassing SPE Protocol Engine 1010. Second, the PRIO bit mechanism provides a less intrusive access to the local interconnection controller configuration registers, in that the injected commands do not contend with transactions that exist in the command pipeline controlled by SPE Protocol Engine 1010. PRIO bit 860 is set, for example, for configuration Read/Write commands to the local interconnection controller.

Pending bit 865 indicates that a new command has been shifted into the mailbox register. Finished bit 870 is set when the command has been completed and indicates that a response to the command is ready to be captured from the mailbox register.

Figure 9:
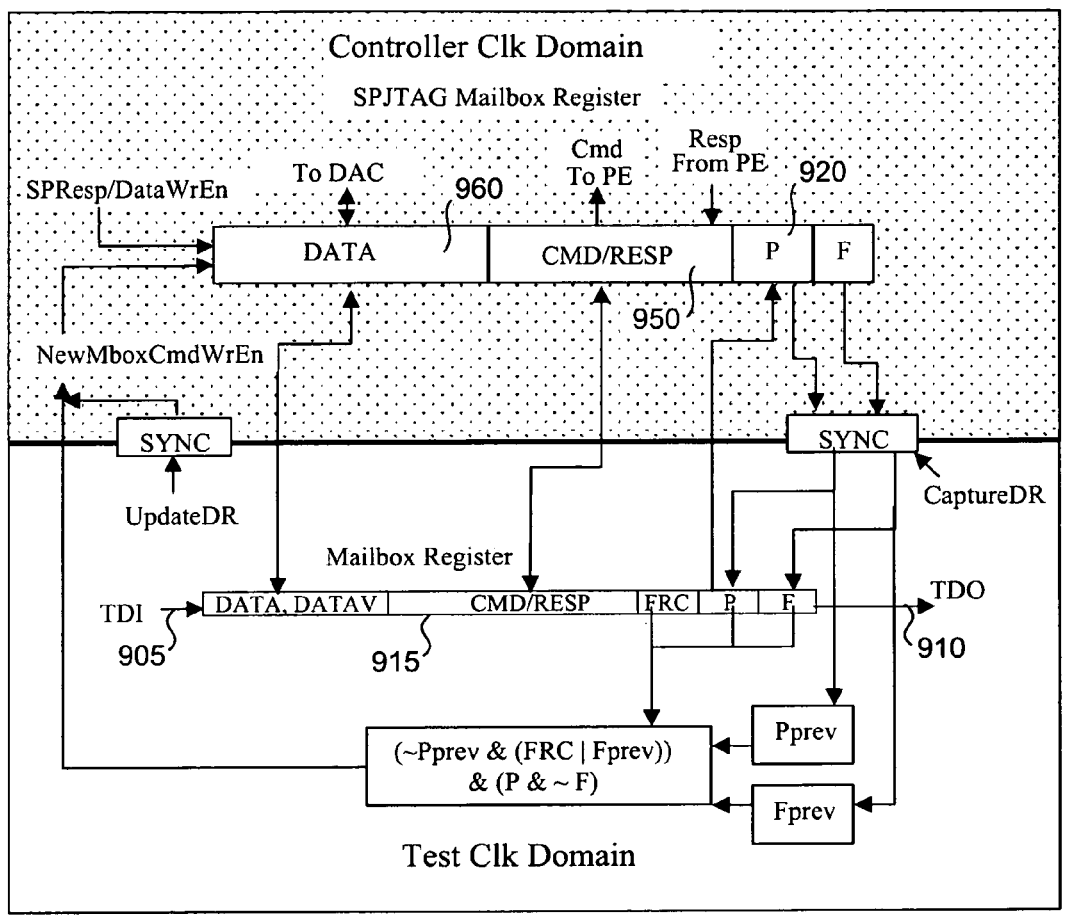
FIG. 9 illustrates a mailbox register in a test clock domain and a corresponding mailbox register in a clock domain of an interconnection controller.

FIG. 9 illustrates some aspects of injecting commands according to the present invention. As noted above, after an instruction register of TAP controller 321 receives an instruction (e.g., from service processor 212) to initiate the process of injecting a command, TAP controller 321 connects TDI pin 905 and TDO pin 910 to mailbox register 915. Mailbox register 915 is in the test clock domain (here, the TAP domain). Mailbox register 915 and corresponding mailbox register 920 in the interconnection controller clock domain may have the format 800 described above, but in FIG. 9 only selected fields are shown.

After the mailbox register 915 is connected with TDI 905 and TDO 910, a TAP controller 321 enters the Shift DR state (see FIG. 3C). In this state, a packet including a command, associated data (if any) and status bits is then loaded into mailbox register 915 via TDI 905. In some embodiments, the packet is loaded into mailbox register 915 by service processor 212. In other embodiments, such information is loaded into mailbox register 915 via another device configured to access test interface 313. As noted above, the packet may be loaded into mailbox register 915 under the control of a user, possibly by interacting with a graphical user interface.

According to one specific embodiment, in order for a successful update to occur, a command must be loaded with Pending bit 865 set and Finished bit 870 clear. Moreover, in this example, a sample of the status flags obtained from Capture-DR state 342 must show that a prior command was accepted (Pprev=0) and completed (Fprev=1). After TAP controller 321 determines that Pending bit 865 is set and Finished bit 870 is clear, TAP controller 321 enters the Update DR state (see FIG. 3C) and asserts an Update DR signal to mailbox register 915. Upon receiving the Update DR signal, mailbox register 915 determines that the entire packet has been shifted in and that mailbox register 915 may perform an update. Accordingly, the command, data and status fields of corresponding mailbox register 920 in the interconnection controller clock domain are then updated.

If FRC bit 855 is set, then the Update is "forced" and the Fprev status bit is ignored. FRC bit 855 is used, for example, if Finished bit 870 is not asserted even after the interconnection controller has completed the previous command, or if the previous command does not have an expected response.

Because the update occurs in the test clock domain, the update signal must be synchronized to the interconnection controller's clock domain. According to some embodiments, Special Functions Unit (SPFU) 1005 (see FIG. 10) performs this synchronization. The synchronized update is qualified with the previously-mentioned conditions regarding the command and status fields.

After the command, data and status fields of mailbox register 920 have been loaded, the packet or packets are forwarded to SPFU 1005 of the interconnection controller. (In alternative embodiments, mailbox register 920 is part of SPFU 1005.) SPFU 1005 inserts the command packet into command pipeline 1006 from buffer 1007. Preferably, SPFU 1005 inserts the command into command FIFO 1008 which may be located, for example, at the input of Special Protocol Engine (SPE) 1010. SPFU 1005 inserts data packets into data stream 1009. Transmitter 1020 forwards the data and commands to the appropriate destinations.

If the injected command needs to access the local configuration registers, then the SPE 1010 will later send the command back to SPCAD 1015. However, if PRIO bit 860 is set, the packet is send directly to SPCAD 1015 directly, bypassing SPE 1010. After SPFU 1005 accepts the command, SPFU 1005 changes Pending bit 865 in mailbox register 920 to "0," indicating that the command has been processed.

According to some embodiments, SPE 1010 has other functions. For example, at the time the system comes out of "reset" mode, the local and remote protocol engines are not functioning right away. The only functioning protocol engine at that time is SPE 1010, which programs and configures the system. Once the system is configured, other protocol engines are activated and take over many system transactions, but SPE 1010 is still responsible for special instructions such as broadcasts, interrupts, etc.

Preferably, the packets are assigned an identifier (e.g., a node ID) that is associated with mailbox register 920. The identifier indicates that the command or data originated from the mailbox and allows, for example, a response to an inserted command to be directed back to the mailbox according to the intra-cluster and inter-cluster protocols.

In this embodiment, service processor 212 polls the data, command and status bits of the mailbox register during Capture-DR state 342, then shifts the results out TDO pin 910 for inspection. Preferably, only Pending bit 865 and Finished bit 870 are shifted out for inspection. If the captured state of Pending bit 865 is clear, service processor 212 knows that the command previously shifted in has been accepted.

After SPE 1010 receives the injected command, SPE 1010 sends the command through the pipeline according to the normal intra-cluster protocol. If the command triggers a response, the response will come back to SPE 1010. According to some implementations, when SPE 1010 receives the response, SPE 1010 (or another component of SPFU 1005) will cause the response to be written into CMD/RESP field 950 of mailbox register 920, e.g., by asserting an SP response write enable ("SPRespWrE") command. SPFU 1005 will cause associated data, if any, to be written into data field 960, e.g., by asserting an SP data write enable ("SPDataWrE") command. Because the data and response may or may not be synchronized, it is preferable to have separate commands for controlling this process. Finished bit 870 is set only after both the data and response are written into mailbox 920.

Meanwhile, service processor 212 has continued to poll the contents of the mailbox register (or, at least, Finished bit 870 is shifted out for inspection). Preferably, while the data, command and status bits are being shifted out, a new set of data, command and status bits are being shifted in. If the captured state of the Finished bit 870 is clear, service processor 212 knows that the command previously shifted in has not been completed. Accordingly, if the command shifted in has not been completed, the contents of mailbox 915 are overwritten with the contents of mailbox 920.

If the captured state of the Finished bit 870 is set, service processor 212 knows that the command previously shifted in has been completed and that a response packet can be copied into the test clock domain in Capture-DR state 342. After capture, the entire contents of mailbox 915 are shifted out. Service processor 212 would then continue polling and injecting new transactions. In preferred implementations, service processor 212 does not need to change the TAP instruction between subsequent commands.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to a particular multi-processor architecture having a limited node ID space and flat request mapping functions. It will be understood, however, that the present invention applies more generally to a wide variety of multi-processor architectures that employ a point-to-point communication infrastructure to facilitate communication among the various nodes in the system. In addition, each of the various aspects of the embodiments described herein relating to, for example, address mapping, routing mechanisms, and transaction identification, may be used in combination with various alternatives of other ones of these aspects without departing from the scope of the invention.

It should also be understood that the various embodiments of the invention may be implemented or represented in a wide variety of ways without departing from the scope of the invention. That is, for example, the interconnection controller described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS), and device types (e.g., ASICs) suitable for designing and manufacturing the processes and circuits described herein are within the scope of the invention. Moreover, a test interface of a processor may be used for receiving injected commands in a manner parallel to that described herein for an interconnection controller.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

We claim:

1. A computer system comprising a plurality of processor clusters, each cluster including a plurality of nodes, the nodes including processors and an interconnection controller interconnected by point-to-point intra-cluster links, each of the processors and the interconnection controller communicating within a cluster via an intra-cluster transaction protocol, inter-cluster links being formed between interconnection controllers of different clusters, each of the processors and the interconnection controller in a cluster having a test interface for communicating with a service processor, at least one of the nodes in a cluster is a command-injecting node configured to receive a command via a test interface and to inject the command into a queue of commands according to the intra-cluster transaction protocol.

2. The computer system of claim 1, wherein the test interface is compliant with the Joint Test Action Group ("JTAG") standard.

3. The computer system of claim 1, wherein the injected command is selected from the group consisting of (a) a command for reading a configuration of a node within a local cluster that includes the service processor that made the injected transaction; (b) a command for writing a configuration of a node within a local cluster that includes the service processor that made the injected transaction; (c) a command for reading a configuration of a node within a remote cluster that does not include the service processor that made the injected transaction; and (d) a command for writing a configuration of a node within a remote cluster that does not include the service processor that made the injected transaction.

4. The computer system of claim 1, wherein the injected command comprises a new transaction.

5. The computer system of claim 1, wherein the injected command comprises a part of a transaction that was in progress before the command was injected.

6. The computer system of claim 1, wherein the interconnection controllers communicate between clusters via an inter-cluster transaction protocol.

7. The computer system of claim 1, wherein the test interface further comprises a mailbox register for receiving the command.

8. The computer system of claim 1, wherein a command is received from the test interface in a first clock domain and at least part of the command-injecting node operates in a second clock domain, and wherein the command-injecting node is further configured for:
   receiving injected transactions in the first clock domain; and
   synchronizing the injected transactions to the second clock domain.

9. The computer system of claim 1, wherein the command-injecting node is an interconnection controller.

10. The computer system of claim 2, wherein the command-injecting node is any device capable of driving the JTAG interface.

11. The computer system of claim 4, wherein the new transaction is within a local cluster that includes the command-injecting node.

12. The computer system of claim 4, wherein the new transaction is within a remote cluster that includes the command-injecting node.

13. The computer system of claim 7, wherein the mailbox register is configured to be connected with a test data in interface and a test data out interface.

14. An interconnection controller for use in a computer system comprising a plurality of processor clusters, each cluster including a plurality of nodes, the nodes including processors and an instance of the interconnection controller interconnected by point-to-point intra-cluster links, each of the processors and the interconnection controller within a cluster communicating via an intra-cluster transaction protocol, the interconnection controller configured to receive commands via a test interface and to inject the commands into a queue of pending commands according to the intra-cluster transaction protocol.

15. The interconnection controller of claim 14, wherein a service processor in a cluster that includes the interconnection controller operates in a first clock domain, wherein the interconnection controller operates in a second clock domain, and wherein the interconnection controller is further configured for:

receiving injected transactions from the service processor in the first clock domain; and synchronizing the injected transactions to the second clock domain.

16. The interconnection controller of claim 14, further comprising a mailbox register for receiving the injected transaction from the service processor.

17. The interconnection controller of claim 14, wherein the queue of pending commands is controlled by a protocol engine, the interconnection controller further configured to process access commands for accessing configuration registers of the interconnection controller without forwarding the access commands to the protocol engine.

18. The interconnection controller of claim 17, further comprising a configuration access unit for processing access commands.

19. An integrated circuit comprising the interconnection controller of claim 14.

20. The integrated circuit of claim 19, wherein the integrated circuit comprises an application-specific integrated circuit.

21. At least one computer-readable medium having data structures stored therein representative of the interconnection controller of claim 14.

22. The at least one computer-readable medium of claim 21, wherein the data structures comprise a simulatable representation of the interconnection controller.

23. The at least one computer-readable medium of claim 21, wherein the data structures comprise a code description of the interconnection controller.

24. The at least one computer-readable medium of claim 22, wherein the simulatable representation comprises a netlist.

25. The at least one computer-readable medium of claim 23, wherein the code description corresponds to a hardware description language.

26. A set of semiconductor processing masks representative of the interconnection controller of claim 14.

* * * * *